United States Patent [19]

Brown

[11] 4,169,511
[45] Oct. 2, 1979

[54] BOOM-PULPIT VEHICLE

[76] Inventor: Philip A. Brown, 4689 - 8 Mile Rd. NW., Conklin, Mich. 49403

[21] Appl. No.: 888,355

[22] Filed: Mar. 20, 1978

[51] Int. Cl.² .......................................... B66F 11/04
[52] U.S. Cl. ...................................... 180/212; 182/2; 414/508
[58] Field of Search ................... 180/26 R, 26 A, 75; 182/2, 13; 214/83.1

[56] References Cited

U.S. PATENT DOCUMENTS

| | | | |
|---|---|---|---|
| 2,954,092 | 9/1960 | Thornton-Trump | 182/2 |
| 2,970,667 | 2/1961 | Bercaw | 180/2 |
| 3,156,313 | 11/1964 | Peterson | 180/75 X |
| 3,319,739 | 5/1967 | Morse | 182/2 |
| 3,379,279 | 4/1968 | Slusher | 182/2 X |
| 3,448,827 | 6/1969 | Clark | 182/2 X |
| 3,789,929 | 2/1974 | Leidig | 180/26 A X |
| 3,856,108 | 12/1974 | Grove | 182/2 X |

Primary Examiner—Trygve M. Blix
Assistant Examiner—Terrance L. Siemens
Attorney, Agent, or Firm—Glenn B. Morse

[57] ABSTRACT

A three-wheeled vehicle has a pulpit boom mounted near a single steering wheel for azimuth and elevation positioning under control from the pulpit. All three wheels are driven, also under control from the pulpit. The boom assembly supporting the pulpit swings laterally over the area generally above, and slightly laterally beyond, the two coaxial wheels. The actuator responsible for boom elevation moves in a sector between diagonal bracing supporting an upper bearing for the vertical journal section of the boom assembly.

2 Claims, 7 Drawing Figures

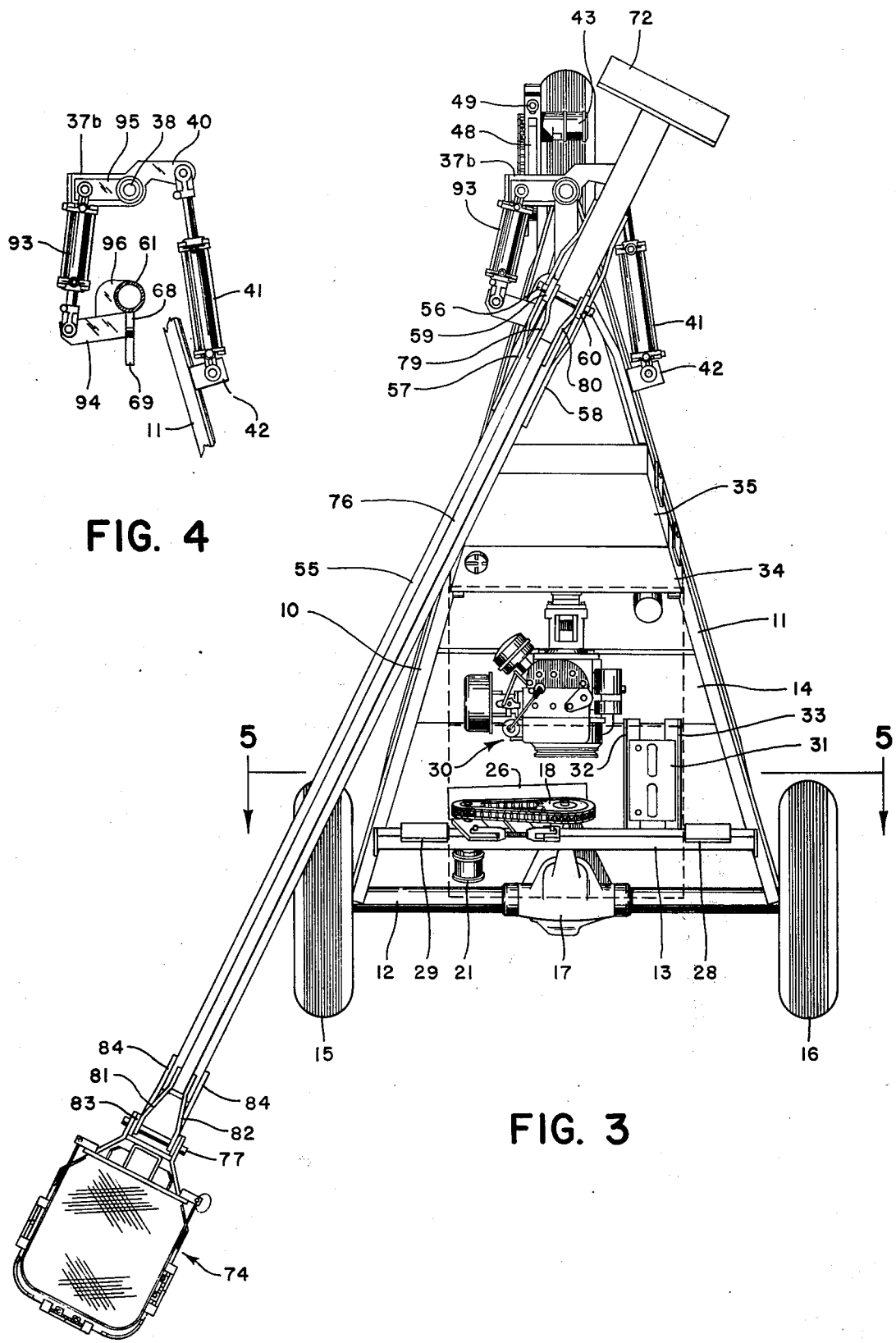

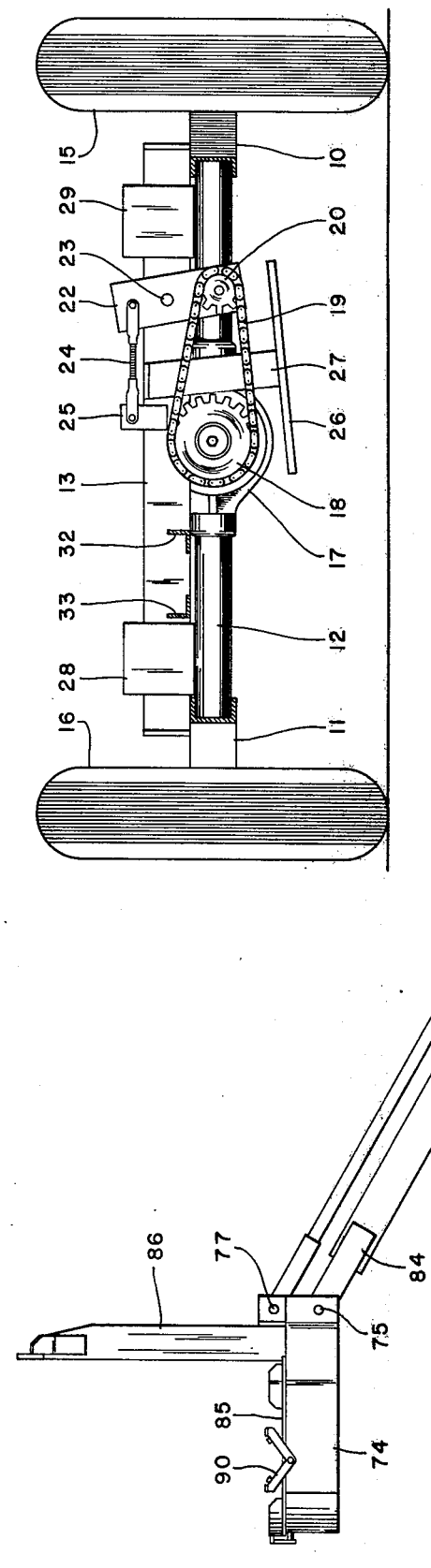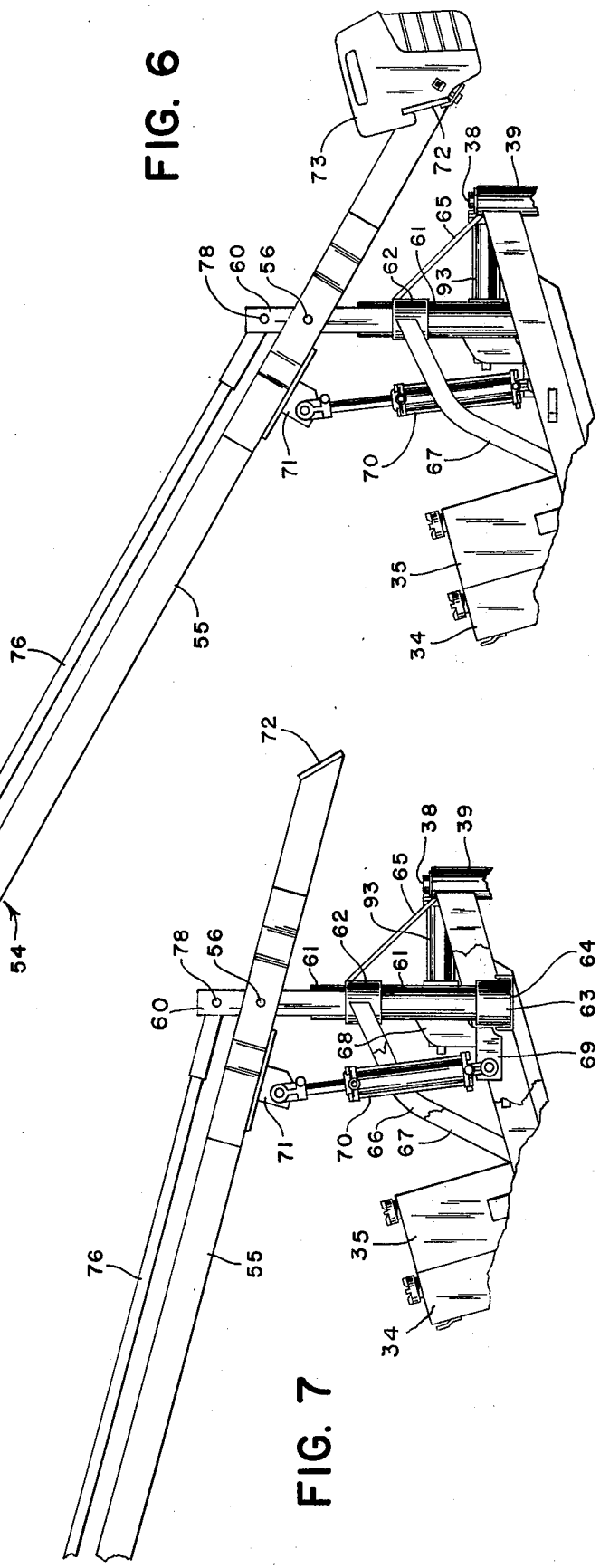

BOOM-PULPIT VEHICLE

BACKGROUND OF THE INVENTION

The maintenance of fruit tree orchards continually necessitates working at elevated positions around the periphery of each of the trees. Special vehicles have been adapted for this purpose, most of these featuring some sort of working platform at the end of a boom that can be swung in azimuth as well as elevated under the control of a workman standing on the platform. This type of vehicle has commonly been called a "cherry picker", although the principal orchard use has been in the trimming of the trees, rather than in the picking of the fruit. The latter is normally done manually through the use of ladders and moveable platforms, as the harvesting process would require an excessive number of the vehicles during the limited time in which the harvesting activity takes place. The name "cherry picker", has nevertheless stuck to this type of vehicle, and it is thus commonly identified in totally unrelated areas of use, where it is useful in performing service operations of various types at elevated positions. Maintenance of street lights, signs, and other overhead equipment will often involve the use of machines mechanically similar to those used in orchard maintenance.

In the operation of these vehicles, the primary lateral maneuverability is accomplished by the machines functioning as a ground vehicle, and steerable to a fairly close position to where the work has to be done. The lateral swinging movement of the boom therefore need only accommodate a fairly limited sector of freedom necessary for final placement of the worker in the lateral direction. The vertical movement necessary to perform this work must all be provided by the elevation of the boom, and thus the primary significance of the freedom of movement of the boom is in elevation, rather than azimuth. A relatively limited sector of freedom of lateral movement is all that is necessary, as this freedom is supplemented by the ground maneuverability of the vehicle. In the construction of these vehicles, cost is a major consideration, as well as the ability of the vehicle to handle relatively rough and soft terrain. These requirements place a considerable premium on the lateral stability of the vehicle for a given total weight. It is important that there be no tendency for the vehicle to tip over, even on sloping ground, when the pulpit containing the workman and his equipment are swung laterally to the limit position.

SUMMARY OF THE INVENTION

The vehicle provided by the present invention has a triangular frame configuration, with a pair of coaxial wheels at two of the corners of this configuration, and a single steerable wheel at the remaining corner. All of these wheels have drive means, with the coaxial wheels being driven through a differential arrangement. The boom has a sector of freedom of lateral movement generally above, and slightly to either side of the coaxial wheels, and the elevation of the boom is controlled through an actuator mounted preferably within the vertically projected area of the frame components, and between diagonal bracing supporting the upper section of a bearing receiving a journal portion of the boom assembly which provides the fulcrum pivot. All of the drive mechanism, and the actuating system for positioning the boom, are controllable from the pulpit. Ballast weights are shiftable between positions adjacent each of the coaxial wheels.

DESCRIPTION OF THE DRAWINGS

FIG. 3 is a plan view of the vehicle, with the boom swung to its position of maximum lateral displacement on one side.

FIG. 4 is a partial section on the plane 4—4 of FIG. 1, with the boom elevating actuator removed.

FIG. 5 is a section on the plane 5—5 of FIG. 3.

FIG. 6 is a partial side elevation of the vehicle appearing in FIG. 1, showing the elevated position of the boom. In FIG. 6, a counterbalance weight appears at the opposite end of the boom from the pulpit.

FIG. 7 is a fragmentary elevation showing the mechanism for actuating the elevation of the pulpit boom. Portions of the diagonal bracing and one of the frame components are broken away to expose the interior structure.

DESCRIPTION OF THE PREFERRED EMBODIMENT

Figure 1:
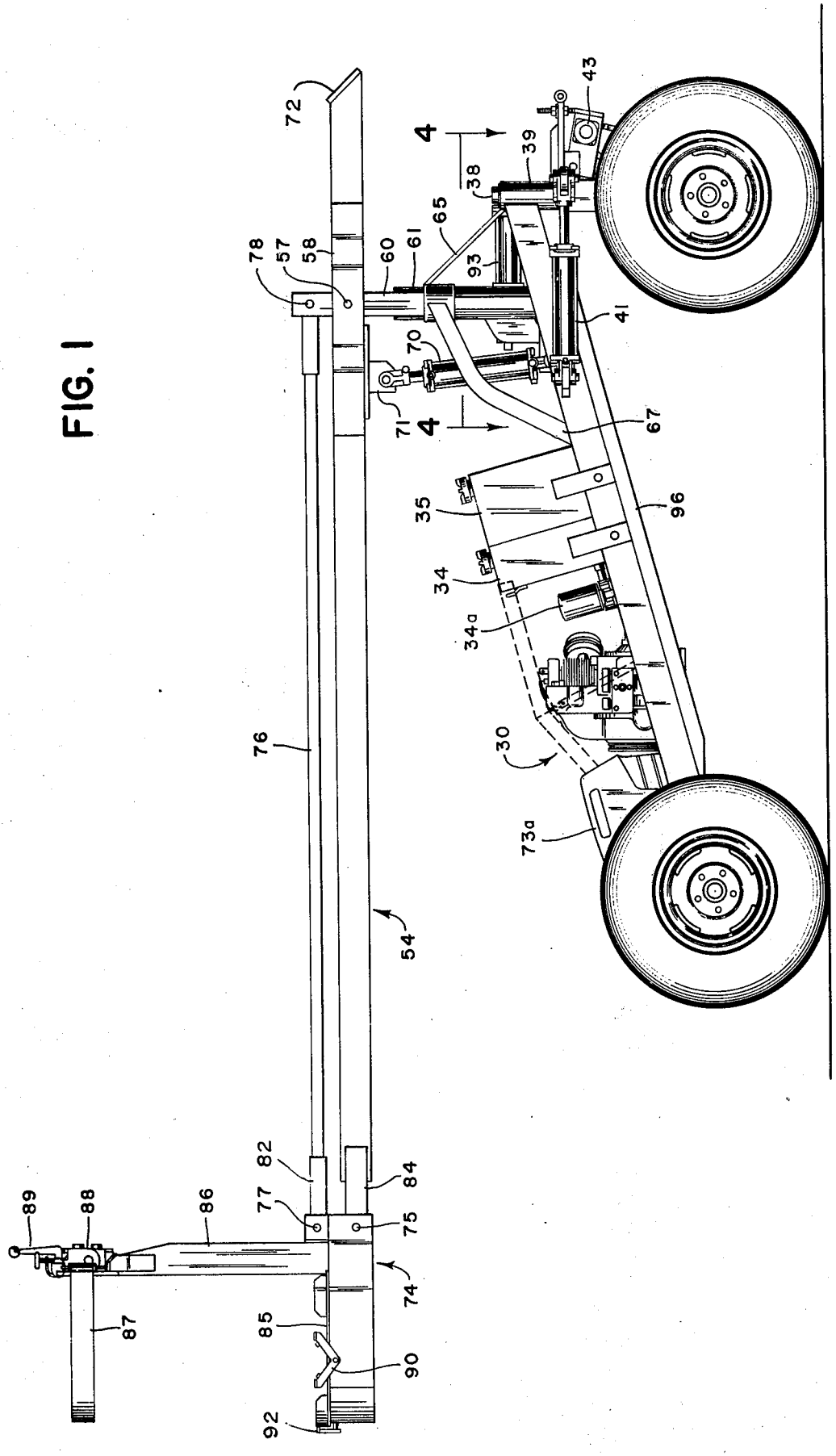
FIG. 1 is a side elevation of the complete vehicle, with the pulpit boom in the horizontal position.

Referring to the drawings, the illustrated vehicle has a generally triangular frame configuration formed by the opposite side members 10 and 11, in conjunction with the tubular axle housing 12. These components are preferably welded together. The supplemental transverse members as shown at 13 and 14 provide support for the operating machinary associated with the hydraulic system responsible for driving the vehicle, and operating the actuators for steering and for positioning the boom assembly.

The coaxial wheels 15 and 16 are mounted at the opposite ends of the axle housing 12, on an axis of rotation fixed with respect to the frame. A conventional automobile differential assembly 17 (Refer to FIG. 5) is driven by the sprocket 18 through the chain 19 from the smaller sprocket 20 operated by a hydraulic motor 21. This motor, together with the sprocket 20, is carried on the bracket 22 pivotally secured to the frame member 13 at the bolt 23. A turnbuckle 24 extending to the fixed bracket 25 also mounted on the member 13 controls the tension on the chain 19. The usual hydraulic connections have been omitted from the drawings for clarity. A plate 26 is carried by the bracket 27, also secured to the member 13, to protect the chain and the sprocket from ground damage. Ballast-support brackets 28 and 29 are secured to the member 13 to receive standard weights of the type commonly associated with tractors and other working vehicles, and these may be selectively utilized to establish the stability of the vehicle as maybe required on slanting terrain.

The power system for the vehicle centers in the internal combustion engine and hydraulic pump assembly generally indicated at 30, these being of conventional design. A cover or hood as indicated in dotted lines in FIG. 1 may be provided over this equipment. A battery 31 is supported by the spaced rails 32-33 extending between the members 13 and 14, for energizing the electrical system of the motor. Tanks for hydraulic fluid and gasoline are respectively indicated at 34 and 35, which bridge across the frame members 10 and 11 for support. These are also conventional.

Figure 2:
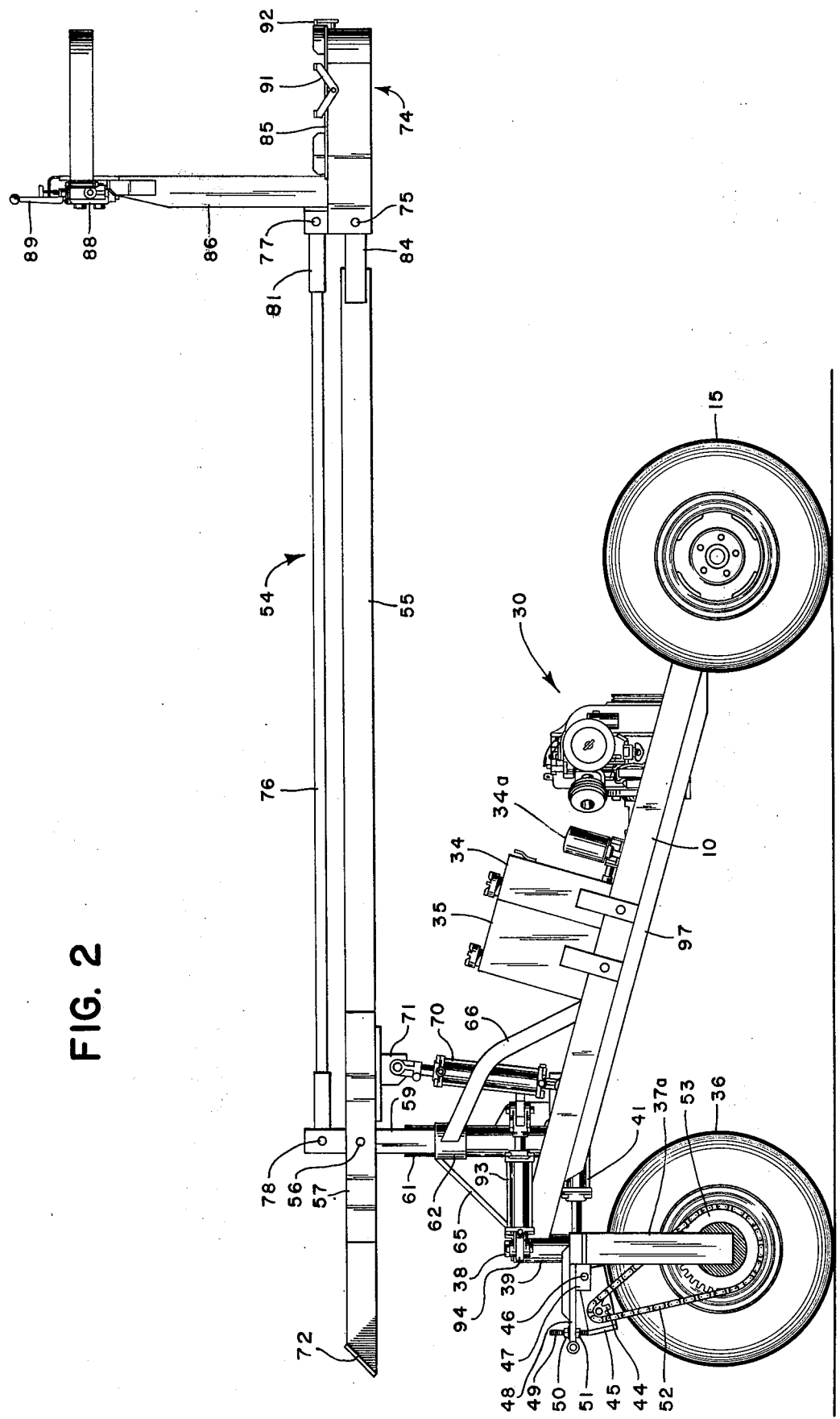
FIG. 2 is a side elevation of the vehicle from the opposite side to that appearing in FIG. 1.

The steerable wheel 36 is supported at the lower extremity of the vertical portion 37a of an L-shaped beam 37. The horizontal portion 37b of this beam is secured to the lower extremity of a stub shaft 38 rotatably received in the bearing sleeve 39 welded at the juncture of the frame elements 10 and 11. Referring to FIG. 4, the radius arm 40 is secured to the upper end of the stub shaft 38, and the hydraulic actuating cylinder 41 extends from this arm to the bracket 42 secured to the frame element 11. Extension and shortening of the cylinder 41 thus controls the steering of the vehicle. A hydraulic motor 43 (Refer to FIG. 3) and its associated sprocket 44 are mounted on the bracket 45 (Refer to FIG. 2) pivotally connected at the bolt 46 to the short flange 47 on the cantilever arm 48 secured to the horizontal portion 37b of the L beam 37. A bolt 49 traverses an elongated opening in the cantilever beam 48, and is secured at its lower extremity to the pivoting member 45. Adjustment of the nuts 50 and 51 on opposite sides of the beam 48 controls the tension on the chain 52 extending around the sprocket 53 fixed with respect to the wheel 36. This mechanism for driving the wheel thus moves with the wheel about the vertical axis of the bearing sleeve 39 with the steering movement.

The boom pulpit assembly generally indicated at 54 centers in the beam 55 supported on the fulcrum bolt 56 traversing the beam 55 and the additional side members 57 and 58. These are spaced centrally from the beam 55 to receive the sections 59 and 60 forming a fork secured to the journal 61 rotating within the vertical-axis bearing sections 62 and 63. (Refer to FIG. 7.) The latter of these rests upon the channel 64 extending between the frame members 10 and 11, and the upper of these bearing sections 62 is positioned by the diagonal braces 65–67 secured at their lower extremities to positions on the frame structure. A radial plate 68 (Refer to FIGS. 4 and 7.) is welded to the journal 61 between the bearings 62 and 63 in an orientation generally parallel to the axis of the journal section. The radial arm 69 is welded to the lower extremity of the plate 68 to form the terminal for the lower end of the hydraulic actuator 70. The effect of this arrangement is to form a structure that reaches around the bearing 63 to a low enough position to provide space for the desired length of the actuator in its closed position. The upper end of the actuator is connected to the bracket 71 welded to the beam 55 of the pulpit boom assembly. Extension of the actuator 70 elevates the pulpit boom about its fulcrum pivot 56. A plate 72 is provided at the right-hand end of the boom 55, as shown in FIGS. 1, 6, and 7 for selectively receiving balance weights 73, which can be placed in position according to the amount of weight expected to be present in the pulpit 74, including the workman and the equipment he would be using. The pulpit is pivotally connected to the outer extremity of the beam 55 at the bolt 75, and the tension rod 76 is also pivotally connected to the pulpit at the bolt 77 and to the upper extremity of the fork members 59 and 60 at the bolt 78. Preferably, the tension rod 76 is provided with a fork-shaped pair of extensions 79–80 to separate the points of bearing on the bolt 78 to bring these points closer to the fork members to reduce the bending effect on the bolt in this area. At the outer extremity of the rod 76 a similar arrangement provides the extensions 81–82 to bring the points of bearing contact with the bolt 77 closer to the walls of the channel 83 of the pulpit assembly. The side extensions 84 of the beam 55 receive the bolt 75, and thus permit the convenient use of square tubing, round tubing, or rolled sections for the beam 55.

The pulpit assembly 74 essentially includes a platform structure 85 and an upright 86 for supporting the safety strap 87 and the control equipment generally indicated at 88 actuated by the lever 89 to steer the vehicle. The unit 88 is essentially a selective hydraulic valve operative to control the extension and retraction of the actuator 41. The pedal unit 90 can be rocked either clockwise or counterclockwise, as shown in FIG. 1, to control the elevation of the pulpit boom, and the similar pedal 91 on the opposite side of the platform 85 controls the hydraulic motors responsible for the application of drive to the wheels of the vehicle. The pedal 92 can be rocked in either direction to control the lateral swinging of the pulpit boom. The hands of the workman standing on the platform 85 are thus left relatively free to handle the equipment he may be using.

In the operation of the vehicle, referring particularly to FIG. 1, the operator will first maneuver the vehicle into a position adjacent to a tree underneath the area in the tree where he expects to be working. If the vehicle is being moved over substantial distances, it can proceed in either direction, with respect to the three-wheel arrangement. In approaching the tree, however, the movement of the vehicle will be generally to the left, as viewed in FIG. 1. The operator will usually select the elevation prior to final placement of the vehicle on the ground. The lateral swinging action is under the control of the actuator 93 (Refer to FIG. 4.) extending between the arm 94 secured to the plate 68, and the arm 95 secured to the bearing sleeve 39 of the frame. It is preferably to strengthen the arm 94 with a reinforcement web 96 welded both to the arm 94 and to the journal 61. Another portion of the vehicle that may require additional reinforcement for stiffness appears at 96–97, where rails or bars are welded to the underside of the adjacent frame beams 10 and 11. The use of these will be determined by the cross-sectional dimensions of the available materials from which these frame components are constructed.

I claim:

1. A boom pulpit vehicle having a frame, a pair of coaxial spaced support wheels rotatably mounted on said frame, a third support wheel rotatably mounted on said frame at a position laterally spaced from the axis of said pair of wheels, said third wheel being moveable about a vertical axis for steering, said vehicle also having differential drive means for said pair of wheels, and a boom pulpit mounted on said frame for pivotal movement about vertical and horizontal axes for elevation and azimuth positioning, wherein the improvement comprises:

bearing means on said frame disposed on a substantially vertical axis, and constituting the vertical axis pivot for said boom pulpit, said bearing means being adjacent said third wheel vertical axis; and drive means for said third wheel, said boom pulpit including means operable to control said drive means and the position of said boom pulpit in azmith and elevation, and said boom pulpit further including an operator's platform and balancing weight-receiving means on the opposite side of the horizontal axis pivot of said boom pulpit from said operator's platform.

2. A vehicle as defined in claim 1, additionally including bracket means adjacent each of said coaxial wheels, respectively, for removeably and selectively receiving ballast weights.

* * * * *